US 7,903,302 B2

(12) United States Patent
Sakakibara

(10) Patent No.: US 7,903,302 B2
(45) Date of Patent: Mar. 8, 2011

(54) IMAGE READING APPARATUS AND IMAGE READING METHOD

(75) Inventor: Jun Sakakibara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 827 days.

(21) Appl. No.: 11/865,273

(22) Filed: Oct. 1, 2007

(65) Prior Publication Data
US 2009/0086294 A1 Apr. 2, 2009

(51) Int. Cl.
*G06K 9/20* (2006.01)
*H04N 1/46* (2006.01)
*H04N 1/04* (2006.01)

(52) U.S. Cl. .......... 358/513; 358/505; 358/474; 382/312

(58) Field of Classification Search .................. 358/474, 358/475, 44, 453, 471, 426.05, 513, 509, 358/505, 501; 382/312
See application file for complete search history.

(56) References Cited

U.S. PATENT DOCUMENTS

| | | | |
|---|---|---|---|
| 6,670,986 B1 * | 12/2003 | Ben Shoshan et al. | 348/219.1 |
| 7,063,264 B2 * | 6/2006 | Bi et al. | 235/487 |
| 7,230,225 B2 * | 6/2007 | Tanimoto et al. | 250/208.1 |
| 7,256,380 B2 * | 8/2007 | Kamisuwa et al. | 250/208.1 |
| 2006/0017761 A1 * | 1/2006 | Matsuzawa et al. | 347/15 |
| 2007/0057987 A1 * | 3/2007 | Miyamoto et al. | 347/19 |
| 2009/0207198 A1 * | 8/2009 | Muraoka | 347/6 |

FOREIGN PATENT DOCUMENTS

| | | |
|---|---|---|
| JP | 2002-374400 | 12/2002 |
| JP | 2003-274115 | 9/2003 |
| JP | 2004-180196 | 6/2004 |

* cited by examiner

*Primary Examiner* — Jerome Grant, II
(74) *Attorney, Agent, or Firm* — Turocy & Watson, LLP

(57) ABSTRACT

There is provide a technique which can contribute to reduction of data capacity of image data read from an original document in an image reading apparatus, and can contribute to realization of a flexible image processing to meet user's requests. There are included a first image reading unit to read an image in monochrome from an original document at a first resolution, a second image reading unit to read an image in color from an original document at a second resolution lower than the first resolution, a position information acquisition unit to acquire position information indicating, in respective image data read by the first and the second image reading units from the same original document, corresponding positions of respective pixels on the original document, a color information acquisition unit to acquire color information indicating colors of the respective pixels in the respective image data, and a storage unit to associate the position information acquired by the position information acquisition unit with the color information acquired by the color information acquisition unit with respect to the pixel corresponding to the position information and to store them in a specified storage area.

20 Claims, 17 Drawing Sheets

FIG.13
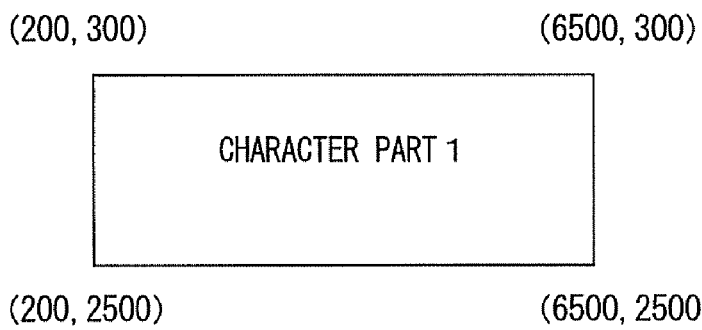
(200, 300)                                            (6500, 300)
CHARACTER PART 1
(200, 2500)                                 (6500, 2500)
START ADDRESS OF CHARACTER PART 1    : (200, 300)
END ADDRESS OF CHARACTER PART 1      : (6500, 2500)
START ADDRESS OF PHOTOGRAPHIC PART 2    : (4000, 6000)
END ADDRESS OF PHOTOGRAPHIC PART 2      : (6500, 8000)
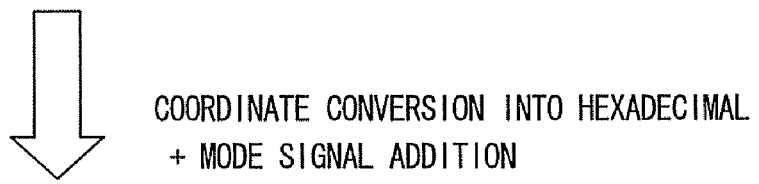
COORDINATE CONVERSION INTO HEXADECIMAL
+ MODE SIGNAL ADDITION
CHA(1) START    : (200, 300)      →      00c8012c (H)
CHA(1) END      : (6500, 2500)   →      09c41964 (H)
PIC(2) START    : (4000, 6000)   →      8fa09770 (H)
PIC(2) END      : (6500, 8000)   →      99649f40 (H)

FIG.14

CHARACTER PART :   MSB [0|x|x|x|x|x|x|x|x|x|x|x|x|x|x] LSB

PHOTOGRAPHIC PART : MSB [1|x|x|x|x|x|x|x|x|x|x|x|x|x|x] LSB

FIG.17

| RESOLUTION CONVERSION PROCESSING TO COLOR SIGNAL | CHARACTER PART 1 | CHARACTER PART 2 | PHOTOGRAPHIC PART 1 | PHOTOGRAPHIC PART 2 |
|---|---|---|---|---|
| | WITH PROCESSING 600dpi | WITH PROCESSING 600dpi | NO PROCESSING 300dpi | NO PROCESSING 300dpi |

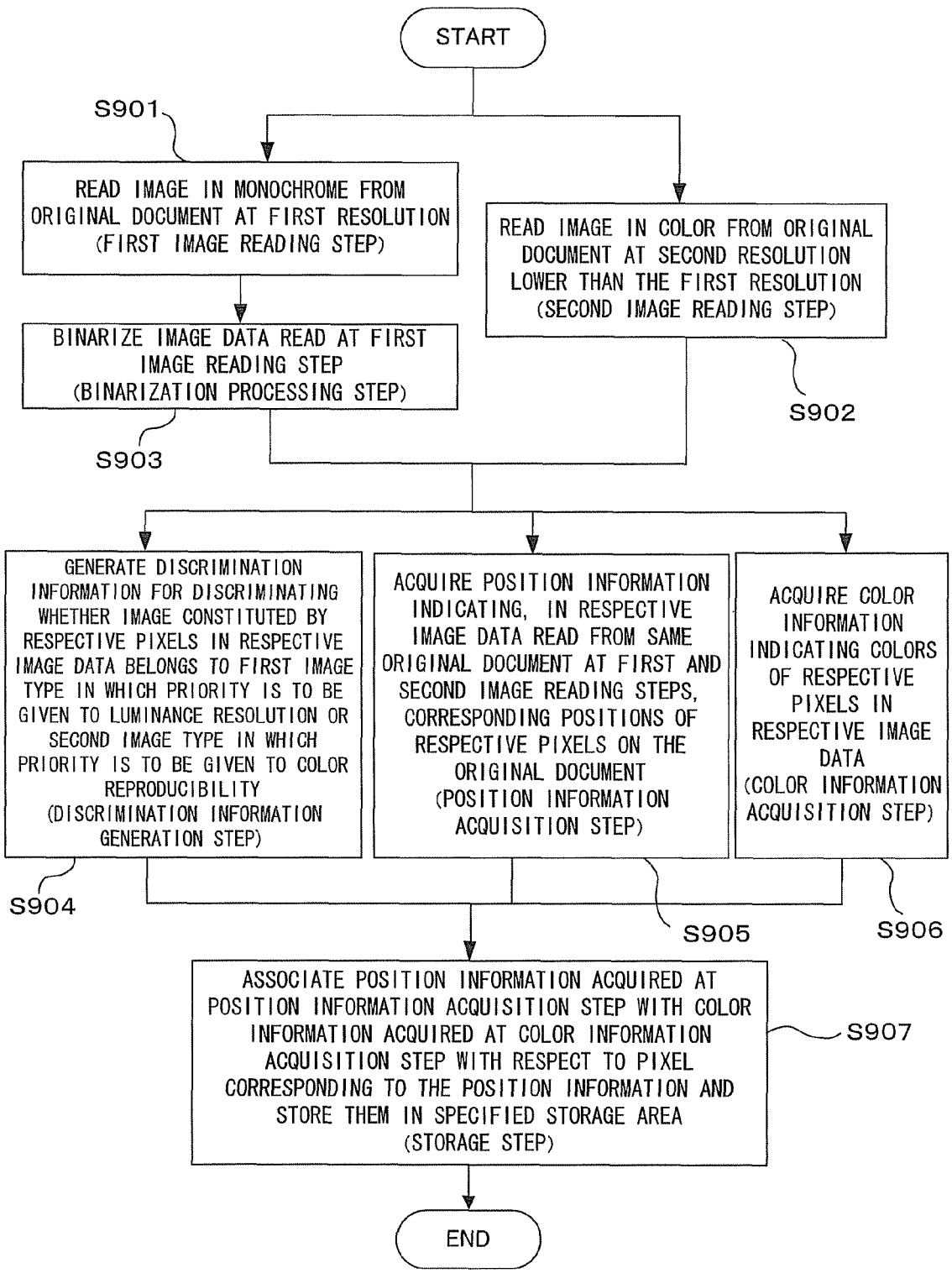

IMAGE READING APPARATUS AND IMAGE READING METHOD

BACKGROUND OF THE INVENTION

1. Field of the Invention

The present invention relates to an image reading apparatus, and particularly to management of image data read from an original document in an image reading apparatus.

2. Description of the Related Art

In recent years, as network technology becomes widespread, document data generated by scanning an original document comes to be used for various uses (data transmission, print output via a network, etc.).

Besides, as a color printer or a color digital copier becomes widespread, colorization of document data has been advanced rapidly.

The colorization of document data becomes indispensable in various scenes such as presentation, and has many merits, however, it has also a defect that an increase in the amount of information is caused. Handling the document data whose capacity is increased by the colorization imposes a large load on a client PC or a network.

For example, in the case where an original document is read in color by a related art image reading apparatus, it is general to use a color sensor in which primary color filters of RED, GREEN and BLUE are arranged on a light receiving surface, for example, a 3-line CCD sensor in which the filters are arranged on light receiving surfaces of respective line sensors.

In the case where an original document of A4 size (210 mm×297 mm) is read at a resolution of 600 dpi by an image reading apparatus using the related art 3-line CCD sensor as stated above, the capacity of image data becomes 105 MByte (35 MByte×RGB), and in the case where an original document of A3 size (420 mm×297 mm) is read, the capacity of data becomes as large as 210 MByte.

Then, in order to suppress the increase in the capacity of document data due to the colorization of the document data, a compression technique of the document data is required.

With respect to the compression technique of the document data, there is known a method in which a rough division is made into an image portion, such as a photograph, generated at a halftone and a line drawing portion including a character, a thin line and the like, and the image portion and the line drawing portion are separately compressed, so that the compression ratio of the document data is increased without impairing the information of the original image (JP-A-2-274174).

However, with the colorization of document data in recent years, the document data is used for many purposes, and therefore, not only the reduction of data, but also a suitable and flexible processing of monochrome information and color information is required.

SUMMARY OF THE INVENTION

It is an object of an embodiment of the present invention to provide a technique which can contribute to reduction of data capacity of image data read from an original document in an image reading apparatus, and can contribute to realization of a flexible image processing to meet user's requests.

In order to solve the problems, according to an aspect of the invention, an image reading apparatus includes a first image reading unit configured to read an image in monochrome from an original document at a first resolution, a second image reading unit configured to read an image in color from an original document at a second resolution lower than the first resolution, a position information acquisition unit configured to acquire position information indicating, in respective image data read by the first and the second image reading units from the same original document, corresponding positions of respective pixels on the original document, a color information acquisition unit configured to acquire color information indicating colors of the respective pixels in the respective image data, and a storage unit configured to associate the position information acquired by the position information acquisition unit with the color information acquired by the color information acquisition unit with respect to the pixel corresponding to the position information and to store them in a specified storage area.

Besides, according to another aspect of the invention, an image reading apparatus includes first image reading means for reading an image in monochrome from an original document at a first resolution, second image reading means for reading an image in color from an original document at a second resolution lower than the first resolution, position information acquisition means for acquiring position information indicating, in respective image data read by the first and the second image reading means from the same original document, corresponding positions of respective pixels on the original document, color information acquisition means for acquiring color information indicating colors of the respective pixels in the respective image data, and storage means for associating the position information acquired by the position information acquisition means with the color information acquired by the color information acquisition means with respect to the pixel corresponding to the position information and for storing them in a specified storage area.

Besides, according to another aspect of the invention, an image reading method includes a first image reading step of reading an image in monochrome from an original document at a first resolution, a second image reading step of reading an image in color from an original document at a second resolution lower than the first resolution, a position information acquisition step of acquiring position information indicating, in respective image data read at the first and the second image reading steps from the same original document, corresponding positions of respective pixels on the original document, a color information acquisition step of acquiring color information indicating colors of the respective pixels in the respective image data, and a storage step of associating the position information acquired at the position information acquisition step with the color information acquired at the color information acquisition step with respect to the pixel corresponding to the position information and storing them in a specified storage area.

DESCRIPTION OF THE DRAWINGS

FIG. 13 is a view for explaining a method of specifying a character area and a photographic area on an image.

FIG. 14 is a view for explaining the method of specifying the character area and the photographic area on the image.

FIG. 17 is a view for explaining the processing timings relating to the resolution conversion processing.

FIG. 18 is a flowchart for explaining a rough flow of a processing (image reading method) in the image reading apparatus of the embodiment.

DESCRIPTION OF THE EMBODIMENTS

Hereinafter, embodiments of the present invention will be described with reference to the drawings.

Figure 1:
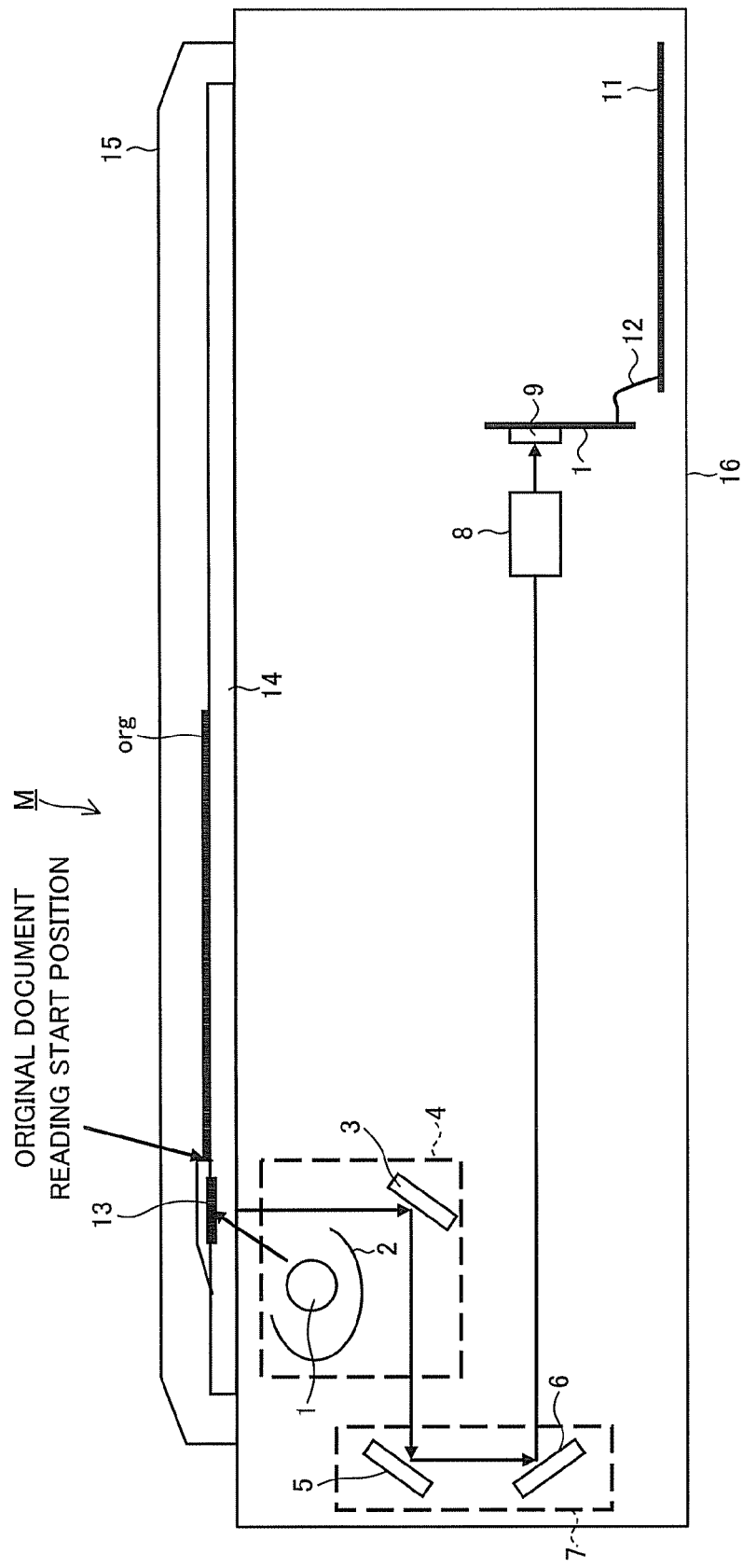
FIG. 1 is a view showing a rough structure of an image reading apparatus M according to an embodiment of the invention.

FIG. 1 is a view showing a rough structure of an image reading apparatus M according to an embodiment.

The image reading apparatus M includes a light source 1 to irradiate light to an original document Org, a reflector 2 to adjust a light distribution characteristic in order to irradiate uniform light to the original document Org, a first mirror 3 to receive reflected light from the original document Org, a second mirror 5 to receive reflected light from the first mirror 3, a third mirror 6 to receive reflected light from the second mirror 5, a condensing lens 8 to form an image on an imaging surface of a 4-line CCD sensor 9 from reflected light from the third mirror 6, the 4-line CCD sensor 9 to convert optical energy focused by the condensing lens 8 into an electric charge by photoelectric conversion and to successively output the formed image as an electric signal to the outside, a CCD sensor board 10 on which the 4-line CCD sensor 9 is mounted, a control board 11 to perform various processings on CCD output signals outputted from the CCD sensor board 10, a harness 11 to electrically connect the CCD sensor board 10 and the control board 11, a white reference plate 13, a document stand glass 14 on which the original document Org is placed, and a document press cover 15.

The light source 1, the reflector 2 and the first mirror 3 constitute a first carriage 4, and the second mirror 5 and the third mirror 6 constitute a second carriage 7. In the case where the original document Org placed on the document stand glass 14 is read, the first carriage 4 is moved from the left to the right in FIG. 1 by not-shown drive means. At this time, in order not to change a light path length as a distance between the original document Org and the imaging surface of the 4-line CCD sensor 9, the second carriage 7 is moved in the same direction as the first carriage 4 at a speed half of the movement speed of the first carriage 4.

Figure 2:
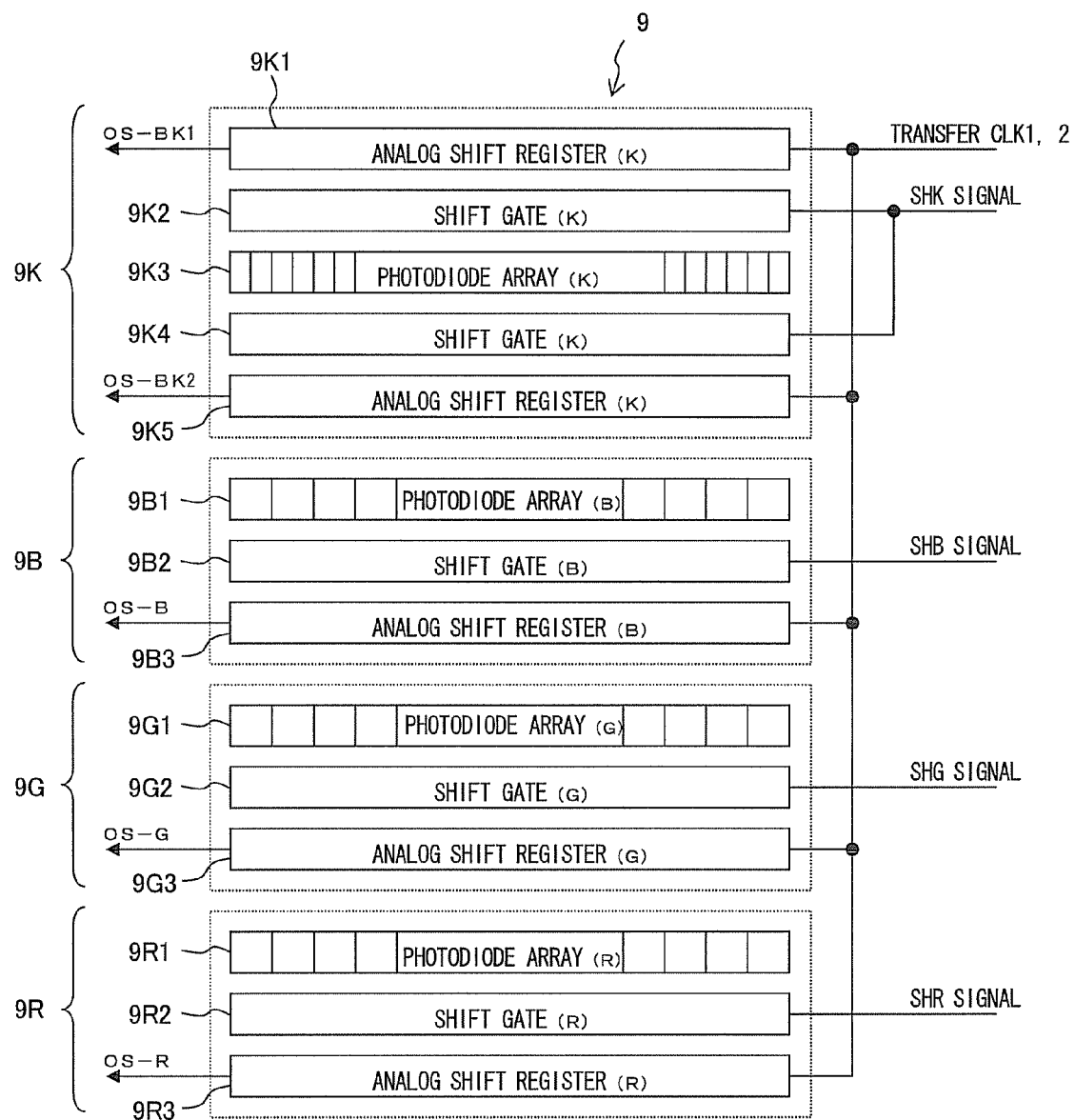
FIG. 2 is a view showing a schematic structure of a 4-line CCD sensor 9.

FIG. 2 is a view showing a rough structure of the 4-line CCD sensor 9. The 4-line CCD sensor 9 includes a monochrome line sensor (first image reading unit) 9K, and a color line sensor (second image reading unit) including a line sensor 9R for red color, a line sensor 9G for red color and a line sensor 9B for blue color.

First, the monochrome line sensor 9K includes a photodiode array 9K3 in which a color filter is not provided on a light receiving surface, a shift gate 9K2 to transfer an electric charge of an odd number pixel converted by the photodiode array 9K3 to an adjacent analog shift register 9K1, the analog shift register 9K1 to successively transfer the electric charge to an output side, a shift gate 9K4 to transfer an electric charge of an even number pixel converted by the photodiode array 9K3 to an adjacent analog shift register 9K5, and the analog shift register 9K5 to successively transfer the electric charge to the output side.

The line sensor 9R for red color includes a photodiode array 9R1 in which a blue filter is arranged on a light receiving surface, a shift gate 9R2 to transfer an electric charge of a pixel converted by the photodiode array 9R1 to an adjacent analog shift register 9R3, and the analog shift register 9R3 to successively transfer the electric charge to the output side.

Besides, the line sensor 9G for green color includes a photodiode array 9G1 in which a blue filter is arranged on a light receiving surface, a shift gate 9G2 to transfer an electric charge of a pixel converted by the photodiode array 9G1 to an adjacent analog shift register 9G3, and the analog shift register 9G3 to successively transfer the electric charge to the output side.

Besides, the line sensor 9B for blue color includes a photodiode array 9B1 in which a blue filter is arranged on a light receiving surface, a shift gate 9B2 to transfer an electric charge of a pixel converted by the photodiode array 9B1 to an adjacent analog shift register 9B3, and the analog shift register 9B3 to successively transfer the electric charge to the output side.

The 4-line CCD sensor 9 shown in FIG. 2 has a structure in which the number of effective pixels of the photodiode array 9K3 is different from that of the photodiode array 9B3, the photodiode array 9G3 and the photodiode array 9R3.

CLK1 and CLK2 to control the respective analog shift registers have reverse phases and are inputted to be stopped in the "H" period in which an SHK signal to control the shift gate 9K2 and the shift gate 9K4, an SHB signal to control the shift gate 9B2, an SHG signal to control the shift gate 9G2, and an SHR signal to control the shift gate 9R2 open the gates and in the periods before and after that. Incidentally, here, although the "H" period is the period in which the gate is opened, no limitation is made to this, and a similar operation can also be performed in the "L" period.

Besides, in the image reading apparatus M of this embodiment, it is assumed that the number of effective pixels of the photodiode array 9K3 is set to be twice that of the photodiode array 9B1, the photodiode array 9G1 and the photodiode array 9R1.

For example, when an original document width of 297 mm is read, when it is assumed that the photodiode array 9K3 reads it at a resolution of 600 dpi (dot per inch), the photodiode array 9B1, the photodiode array 9G1 and the photodiode array 9R1 read it at a resolution of 300 dpi.

Figure 3:
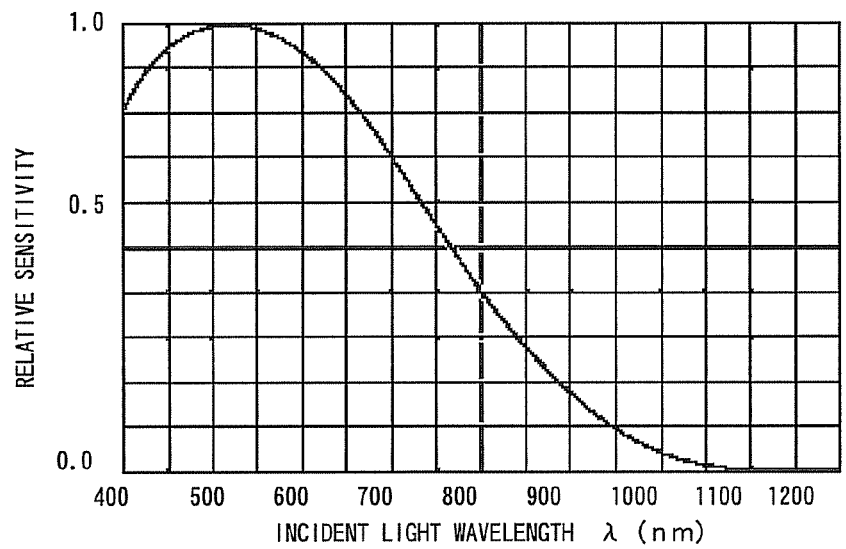
FIG. 3 is a graph showing a spectral sensitivity characteristic of a line sensor 9K.
Figure 4:
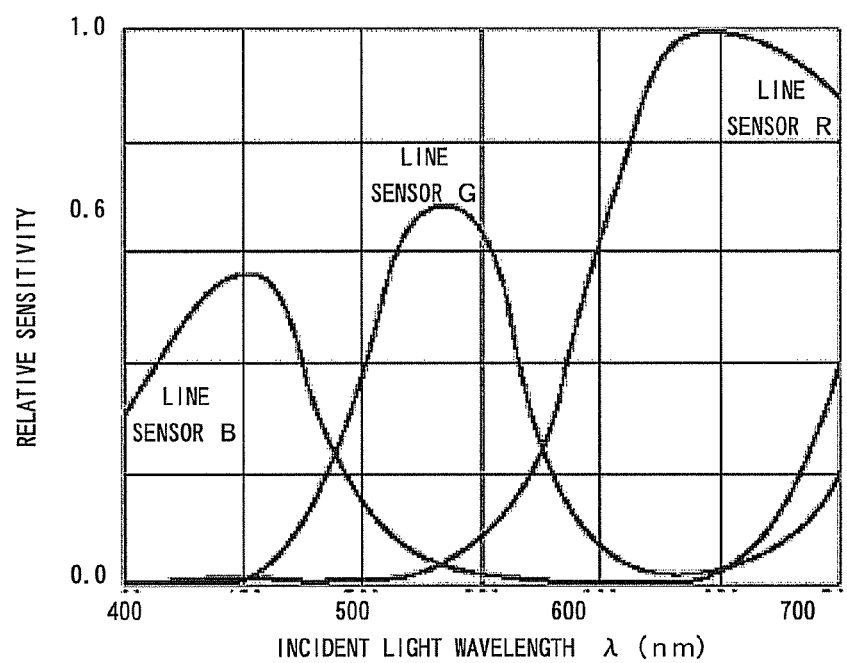
FIG. 4 is a graph showing a spectral sensitivity characteristic of each of a line sensor 9R, a line sensor 9G and a line sensor 9B.

FIG. 3 is a graph showing a spectral sensitivity characteristic of the line sensor 9K, and FIG. 4 is a graph showing a spectral sensitivity characteristic of each of the line sensor 9R, the line sensor 9G and the line sensor 9B.

As stated above, the 4-line CCD sensor 9 includes the line sensor 9K in which a color filter is not arranged on the light receiving surface and the line sensors 9R, 9G and 9B in which the color filters are arranged, and in the case where light from the light source is uniformly irradiated to these line sensors, the line sensor 9R, the line sensor 9G, or the line sensor 9B has the sensibility to only a wavelength in a specific region, whereas the line sensor 9K has the sensibility to a wavelength region from less than 400 nm to a portion exceeding 1000 nm, and accordingly, the amplitude of an outputted analog signal is larger than the amplitude of an analog signal outputted from the line sensor R, G and B.

In the case where the original document org is, for example, an original document of A4 size, its area is 297 mm in longitudinal direction by 210 mm in short direction. In the case where the original document reading operation is performed while the longitudinal direction of the original document is made the main scanning direction, and the short direction is made the sub-scanning direction, it is required that the number of effective pixels of the photodiode array of the CCD line sensor 9 is at least 7016 pixels (4677 pixels at the time of 400 dpi).

In general, the sensor has 7500 pixels (5000 pixels at the time of 400 dpi). Besides, as shown in FIG. 3, the CCD line sensor includes a light shield pixel portion shielded by aluminum or the like at a part of the photodiode array so that light is not incident on the first part of the effective pixels of 7500 pixels, and dummy pixels and preliminary feeding portions before and after the effective pixels, and accordingly, in order to output all electric charges stored in the CCD line sensor to the outside, the number of transfer CLKs exceeding the 7500 pixels is required.

Here, when it is assumed that the total of the light shield pixel portion, the preliminary feeding portion, and the dummy pixel portion outside the effective pixel area is 500 in the number of transfer CLKs, in order to output all the electric charges stored in the CCD line sensor for one line to the outside, a time equivalent to 8000 transfer CLKs is required, and the time becomes the light integration time (tINT) of one line.

Figure 5:
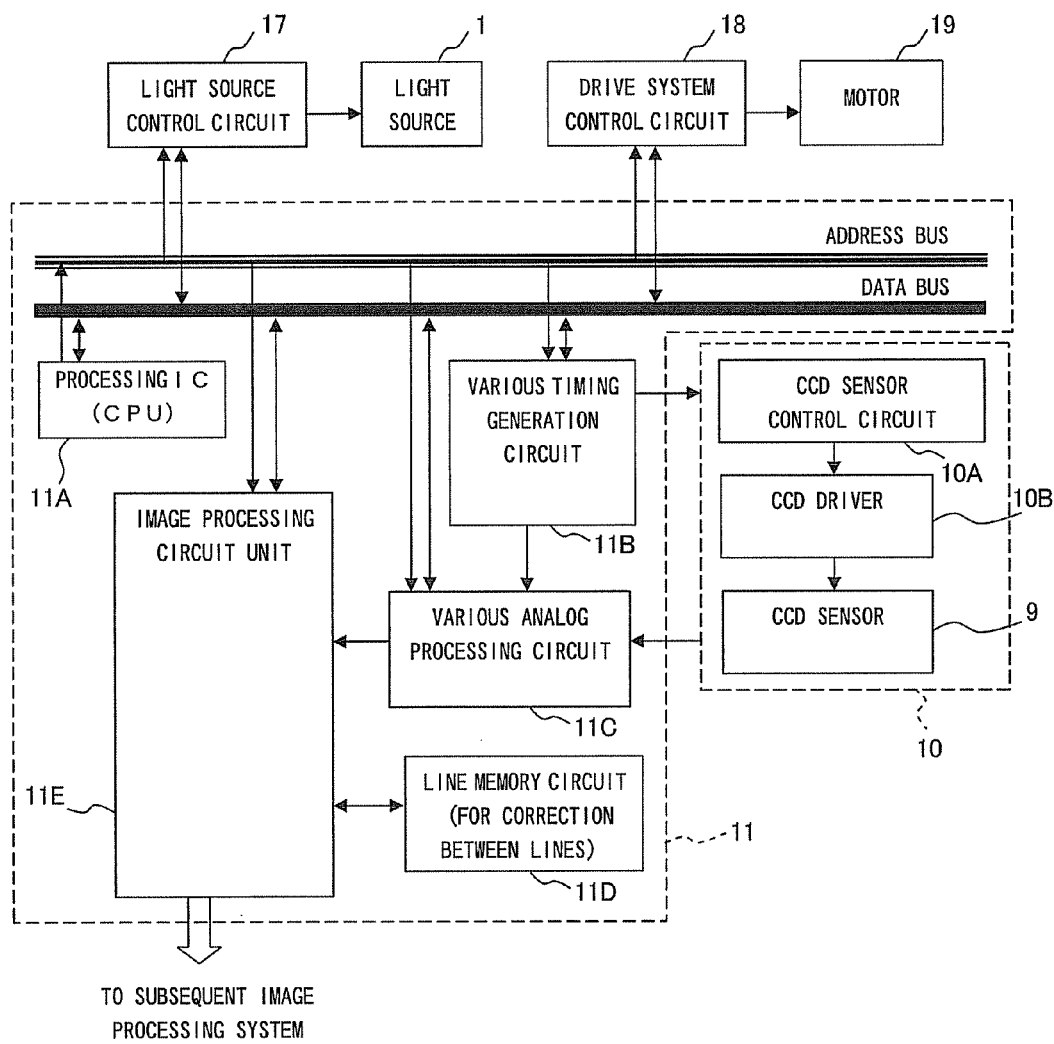
FIG. 5 is a view showing a schematic structure of a control circuit system in the image reading apparatus M according to the embodiment.

Next, the details of the control board 11 will be described. FIG. 5 is a view showing a rough structure of a control circuit system in the image reading apparatus M of the embodiment.

The control board 11 includes a processing IC 11A such as a CPU, a various timing generation circuit 11B, a various analog processing circuit 11C, a line memory circuit 11D, and an image processing circuit unit 11E.

The processing IC 11A controls a signal processing system of the CCD sensor 9, and further controls, by using control signals of an address bus and a data bus, a light source control circuit 17 to control the light source 1, and a drive system control circuit 18 to control a motor 19 for moving the first carriage 4 and the second carriage 7.

The various timing generation circuit 11B generates signals necessary for driving the CCD sensor 9, such as the SH signal and the transfer CLK1, 2 shown in FIG. 2, and signals necessary for various analog processings. The signals generated by the various timing generation circuit 11B and necessary for driving the CCD line sensor 9 are subjected to timing adjustment by a CCD sensor control circuit 10A and are inputted to the CCD line sensor 9 through a CCD driver 10B to perform processing for signal amplitude level matching and waveform shaping. Here, the CCD sensor control circuit 10A may be included in the various timing generation circuit 11B.

The output from the CCD line sensor 9 is inputted to the various analog processing circuit 11C, and is subjected to a specified analog processing. Incidentally, the various analog processing circuit 11C is not necessarily arranged on the control board 11, and for example, even if it is arranged on the CCD sensor board 10, there is no problem in the function.

As shown in FIG. 2, in the CCD line sensor 9, the respective line sensors are arranged at specified intervals, a shift occurs in the reading positions of the respective line sensors. The line memory circuit 11D corrects the shift of the reading position. The image processing circuit unit 11E controls the line memory circuit 11D, and further performs processing such as a shading correction performed by using an image signal converted into a digital signal, an enlargement/contraction processing, and a LOG conversion. Besides, a processing of reading a color original document and converting the image into a monochrome signal of an achromatic color is also performed in this image processing circuit unit 11E.

Figure 6:
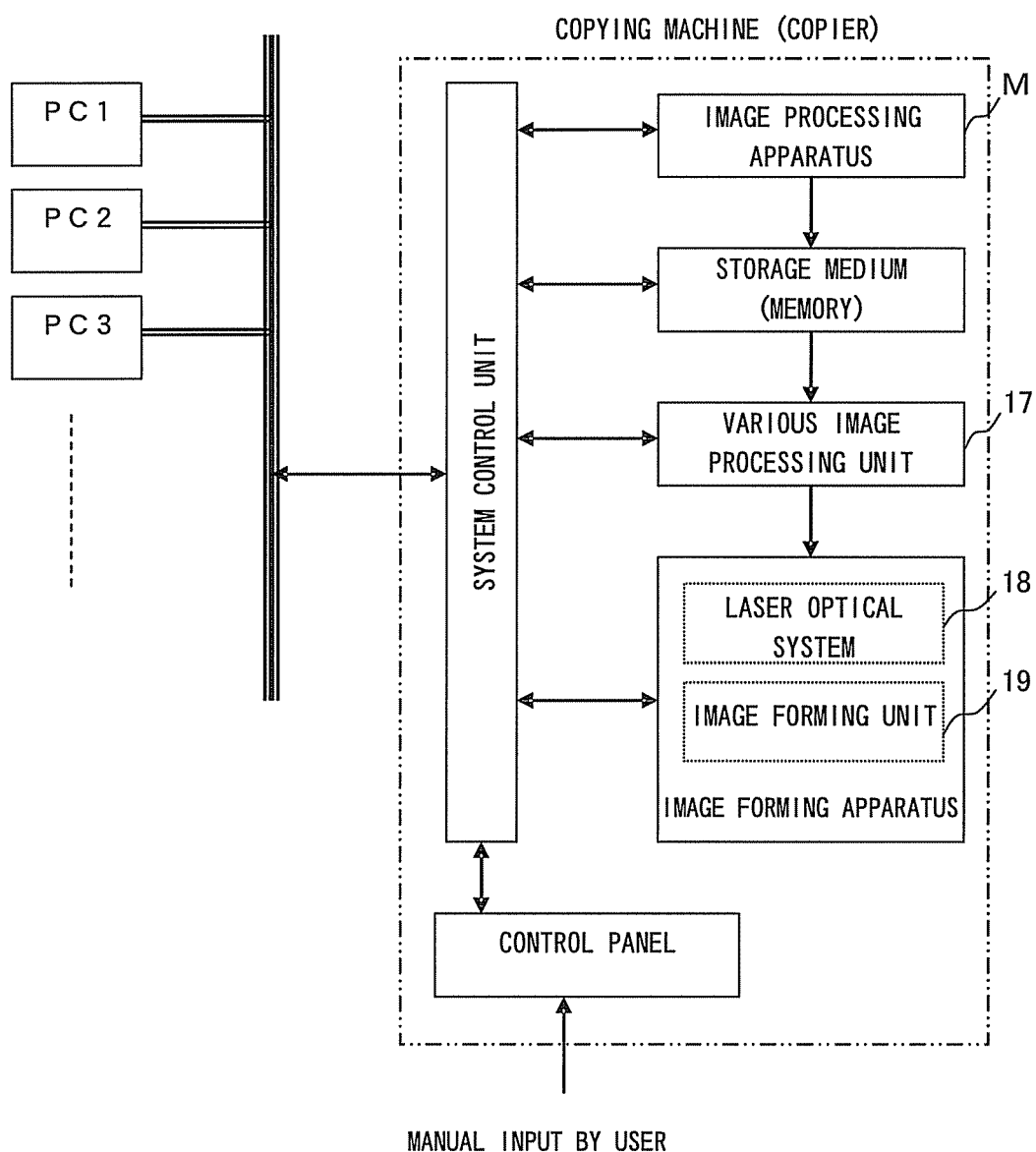
FIG. 6 is a view showing a conceptual view of a copying apparatus including the image reading apparatus M of the embodiment and an image forming apparatus.

FIG. 6 is a view showing a conceptual view of a copying apparatus including the image reading apparatus M of the embodiment and an image forming apparatus.

The copying apparatus includes, for example, the image reading apparatus M, a memory as a storage medium, a various image processing unit 17, an image forming apparatus (printer unit B) having a laser optical system 18 using a semiconductor laser and an image forming unit 19 to form an image with toner by using a photographic process, a system control unit to control all of these, and a control panel in which a user performs direct input. In the case where communication is performed between the copying apparatus and external PC1, PC2, PC3, . . . , the copying apparatus is connected to these PCs through a network from the system control unit.

Figure 7:
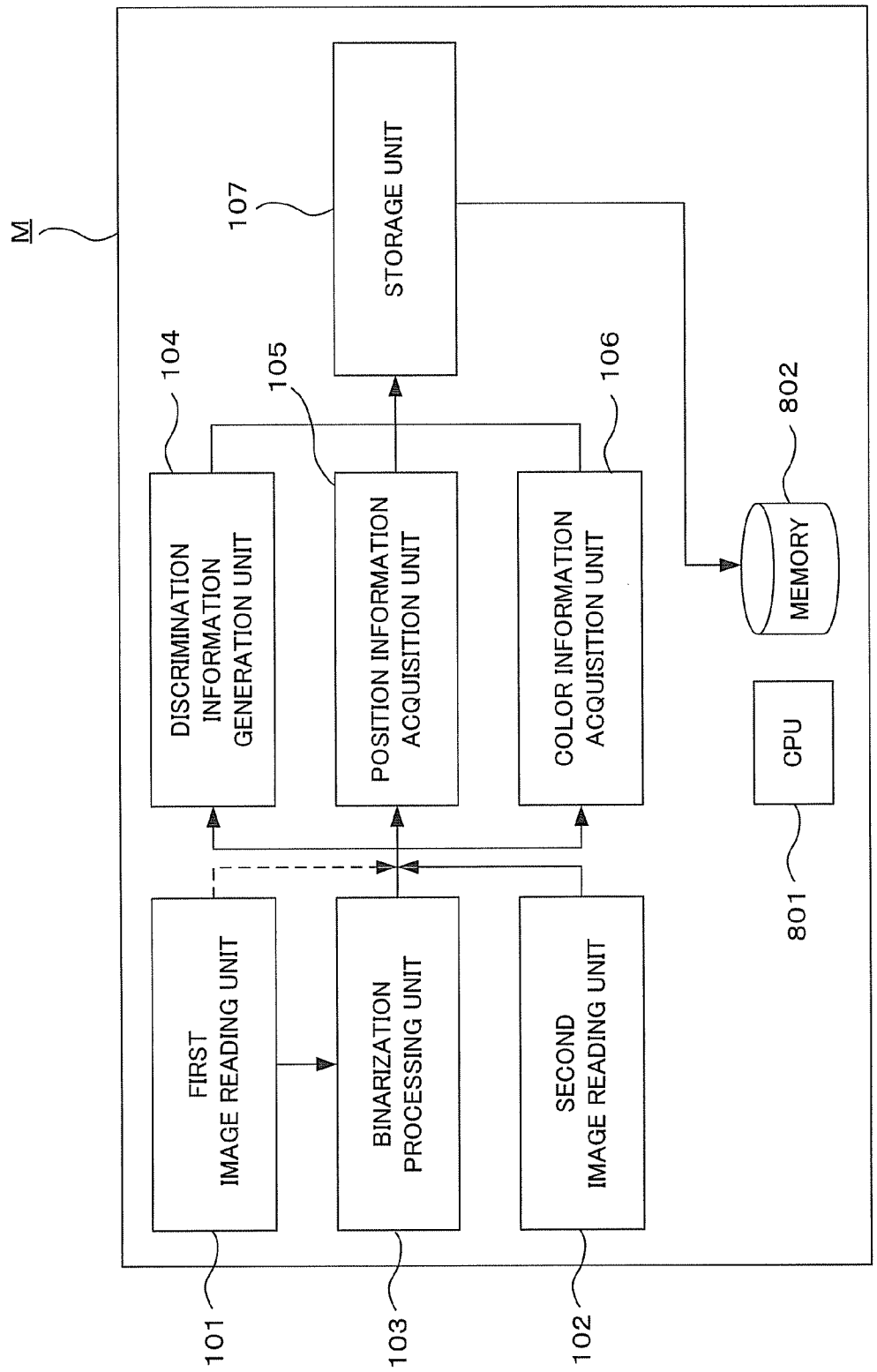
FIG. 7 is a functional block diagram for explaining the image reading apparatus M of the embodiment.

FIG. 7 is a functional block diagram for explaining the image reading apparatus M of the embodiment.

A first image reading unit 101 reads an image in monochrome from an original document at a first resolution (for example, 600 dpi).

A second image reading unit 102 reads an image in color from an original document at a second resolution (for example, 300 dpi) lower than the first resolution.

A binarization processing unit 103 binarizes image data read by the first image reading unit 101.

A discrimination information generation unit 104 generates discrimination information for discriminating whether an image constituted by respective pixels in respective image data belongs to "first image type" in which priority is to be given to luminance resolution or "second image type" in which priority is to be given to color reproducibility. Specifically, the discrimination information generation unit 104 generates, as the discrimination information, color spatial frequencies of the respective pixels in the respective image data.

A position information acquisition unit 105 acquires position information indicating, in the respective image data read from the same original document by the first image reading unit 101 and the second image reading unit 102, corresponding positions of the respective pixels on the original document.

A color information acquisition unit 106 acquires color information indicating colors of the respective pixels in the respective image data. Incidentally, in this embodiment, the color information acquisition unit 106 is configured to acquire the color information of the respective pixels in the image data read by the first image reading unit 101 based on the image data binarized by the binarization processing unit 103, so that the color information acquisition unit can contribute to reduction in the capacity of the monochrome image data read at the high resolution by the first image reading unit 101 and reduction in the data capacity of the color information of the image data.

A storage unit 107 associates the position information acquired by the position information acquisition unit 105, the color information acquired by the color information acquisition unit 106 with respect to the pixel corresponding to the position information, and the discrimination information generated by the discrimination information generation unit 104 with respect to the pixel corresponding to the position information with one another, and stores them into, for example, a MEMORY 802 or a not-shown page memory (specified storage area). At this time, the storage unit 107 stores the respective information simultaneously into the page memory.

The storage unit 107 groups the position information and the color information based on the discrimination information, and stores them in the specified storage area.

As stated above, the position information and the color information belonging to the same image type are stored at continuous addresses in the specified storage area, so that it is possible to increase access efficiency to the memory for referring to the position information and the color information stored in the specified storage area at the time when a processing on pixels constituting the image of the specific image type in the image data is performed later.

A CPU 801 has a role to perform various processings in the image reading apparatus, and has also a role to realize various functions by executing programs stored in the MEMORY 802. The MEMORY 802 includes, for example, a ROM and a RAM, and has a role to store various information and programs used in the image reading apparatus.

Figure 8:
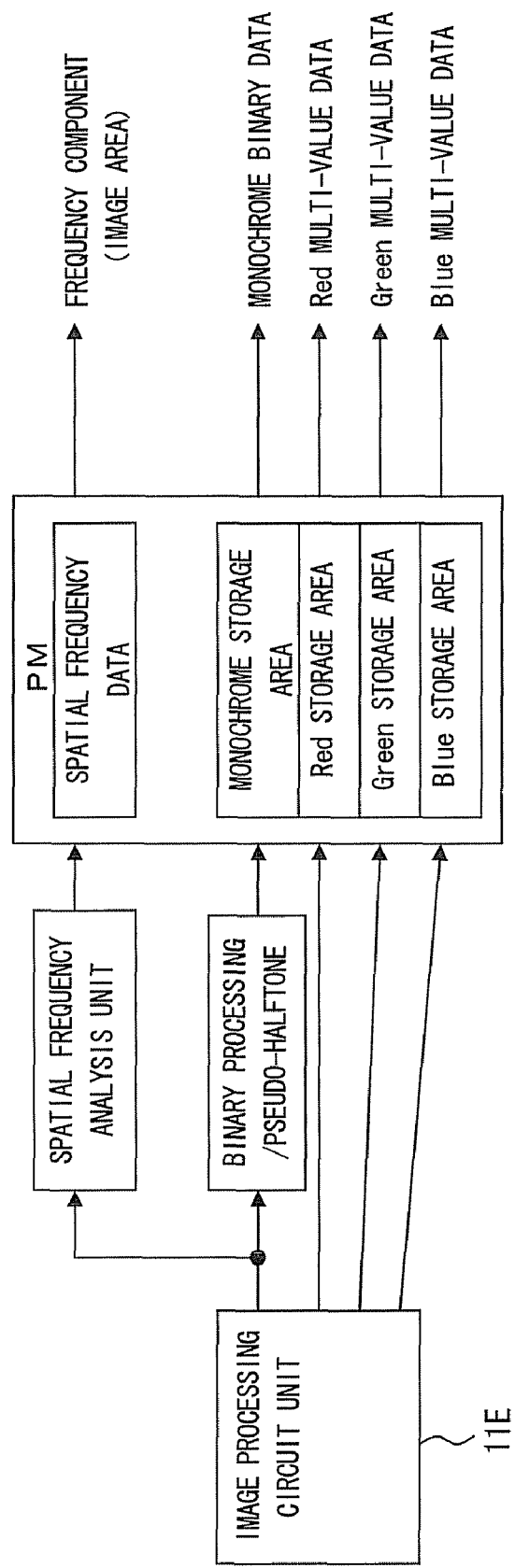
FIG. 8 is a view showing a flow of processing in the image reading apparatus M of the embodiment.

FIG. 8 is a view showing a flow of processing in the image reading apparatus M of the embodiment.

A monochrome signal of 600 dpi and RGB color signals each having 300 dpi are simultaneously outputted from the image processing circuit unit 11E after positioning of the image is performed by the line memory circuit 11D. In order to reduce the image data, the monochrome signal is inputted to a subsequent binarization processing/pseudo-halftone processing (binarization processing unit 103) and a spatial frequency analysis unit (discrimination information generation unit 104) of the image described later.

In the subsequent page memory PM, the spatial frequency information (discrimination information) generated based on the monochrome signal by the discrimination information generation unit 104, the monochrome 600-dpi binary data, the Red 300-dpi signal, the Green 300-dpi signal, and the Blue 300-dpi signal are respectively stored in different areas.

Hereinafter, for reference, a comparison is made between the amount of data in the related art in the case where color information of A3 size is read and the amount of data in the case where it is read by the image reading apparatus M of the embodiment. When the original document has the A3 size (297 mm×420 mm), there are 7010 pixels in the main scanning direction, and there are 9912 lines in the sub-scanning direction. Here, when the data is such that one color pixel has 8 bits, the required capacity is 7010 pixels×9912 lines×three colors and is about 210 MByte.

In the image reading apparatus M of the embodiment, the capacity of the monochrome data is 7010 pixels×9912 lines by the binarization processing and is 69.5 Mbit, that is, about 8.7 MByte. Besides, since the color data capacity has the resolution of 300 dpi, there are 3505 pixels in the main scanning direction, and there are 4956 lines in the sub-scanning direction, and the required capacity is 3505 pixels×4956 lines×three colors and about 52 MByte. Since after-mentioned spatial frequency data has several Byte to several tens Byte and is very small, this is neglected here, and the related art image reading apparatus has about 210 MByte, whereas the image reading apparatus of the embodiment has about 61 MByte (monochrome 8.7 MByte+color 52 MByte).

As stated above, although the monochrome and color signals are individually stored in the storage area, since the monochrome data is binarized, a reduction of nearly 70% in the storage capacity can be made. This results in the reduction of the amount of data transfer in a given time, and even if the whole circuit is not speeded up, high speed reading becomes possible, and therefore, this means that a contribution can be made to the shortening of a front job time as a user.

Figure 9:
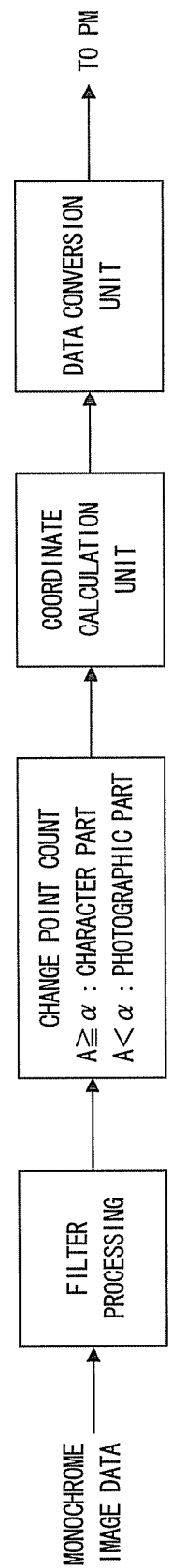
FIG. 9 is a view for explaining a processing in a discrimination information generation unit 104.
Figure 10:
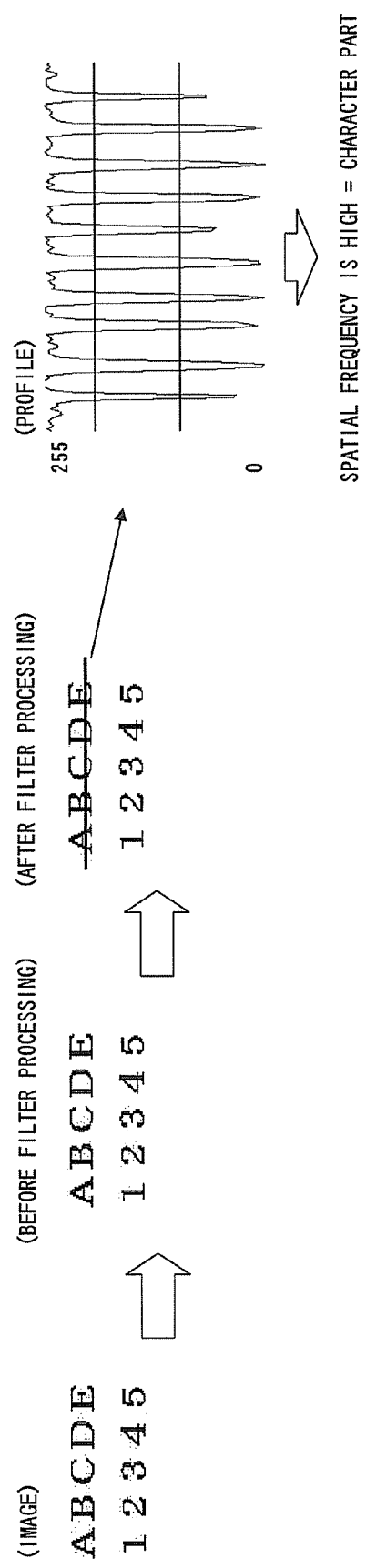
FIG. 10 is a view for explaining the processing in the discrimination information generation unit 104.
Figure 11:
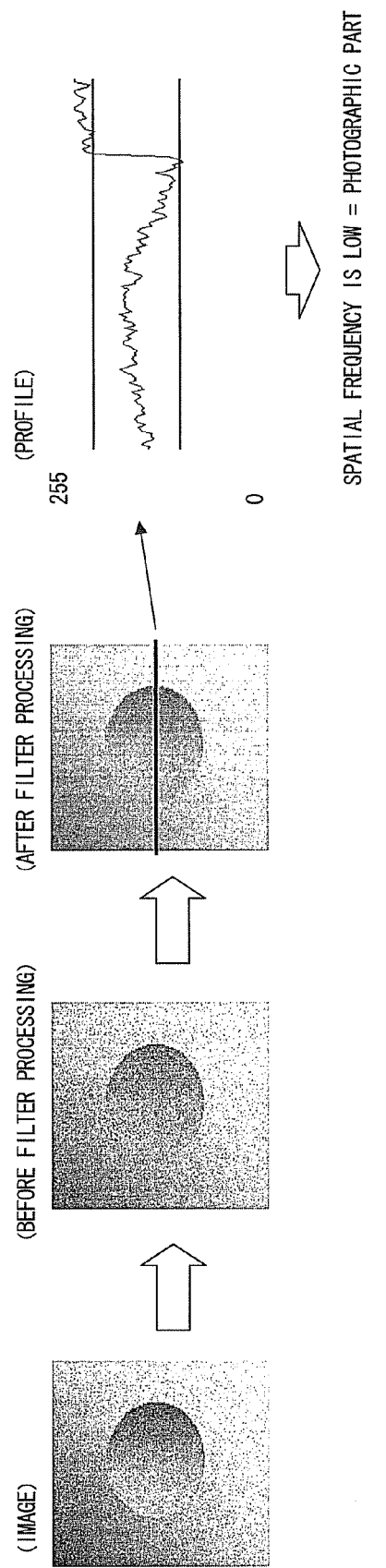
FIG. 11 is a view for explaining the processing in the discrimination information generation unit 104.

Subsequently, a processing in the discrimination information generation unit 104 will be described with reference to FIG. 9, FIG. 10 and FIG. 11.

Since the image data of 8 bits outputted from the image processing circuit unit 11E has been subjected to the shading correction processing, sensibility variation among the respective pixels of the line sensor and the influence of aberration due to the optical system are corrected, however, a singular point, such as dirt, on the original document, and the roughness of the image due to the sheet of the original document itself can not be corrected, and therefore, a filter processing is performed at the first part of the spatial frequency analysis unit, and the roughness (dispersion) occurring on the monochrome signal is suppressed.

In the filter processing, for example, the processing of averaging several pixels in the main scanning direction is performed. Thereafter, data (color spatial frequency) is analyzed in units of lines. For example, it is counted how many times an image change exceeding the range of image data 100 to 200 LSB occurs, and it is possible to determine that the area is "character document area (see FIG. 10)" or "line drawing area" when the number is a specified threshold or larger (color spatial frequency is high), and the area is "photographic area (see FIG. 11)" of non-character when the number is smaller than the specified threshold. When the flow of the processing using specific images shown in FIG. 10 and FIG. 11 is seen, it is understood that many profiles in the character portion are changed in the range exceeding the image data 100 to 200 LSB. Besides, although 100 to 200 LSB is set for explanation, it is necessary to set the determination range in view of the data of color characters and color lines and the roughness after the filter processing.

The discrimination information generation unit 104 performs the foregoing processing, and generates discrimination information for discriminating the character area on the image from the photographic area. At this time, as shown in FIG. 12, in the case where the character area and the photographic area are mixed on one image, information of coordinates or the like of respective objects is extracted.

In the case of an original document of A3 size, when the main scanning direction is made an x direction, and the sub-scanning direction is made a y direction, and when the x direction is from 0 to 8000 (297 mm=7010 pixels+margin between the leading edge and the trailing edge), and the y direction is from 0 to 10000 (420 mm=9912 lines+margin between the leading edge and the trailing edge), the image information (x, y) can be expressed by coordinates of (x, y)=(0, 0) to (8000, 10000).

Figure 12:
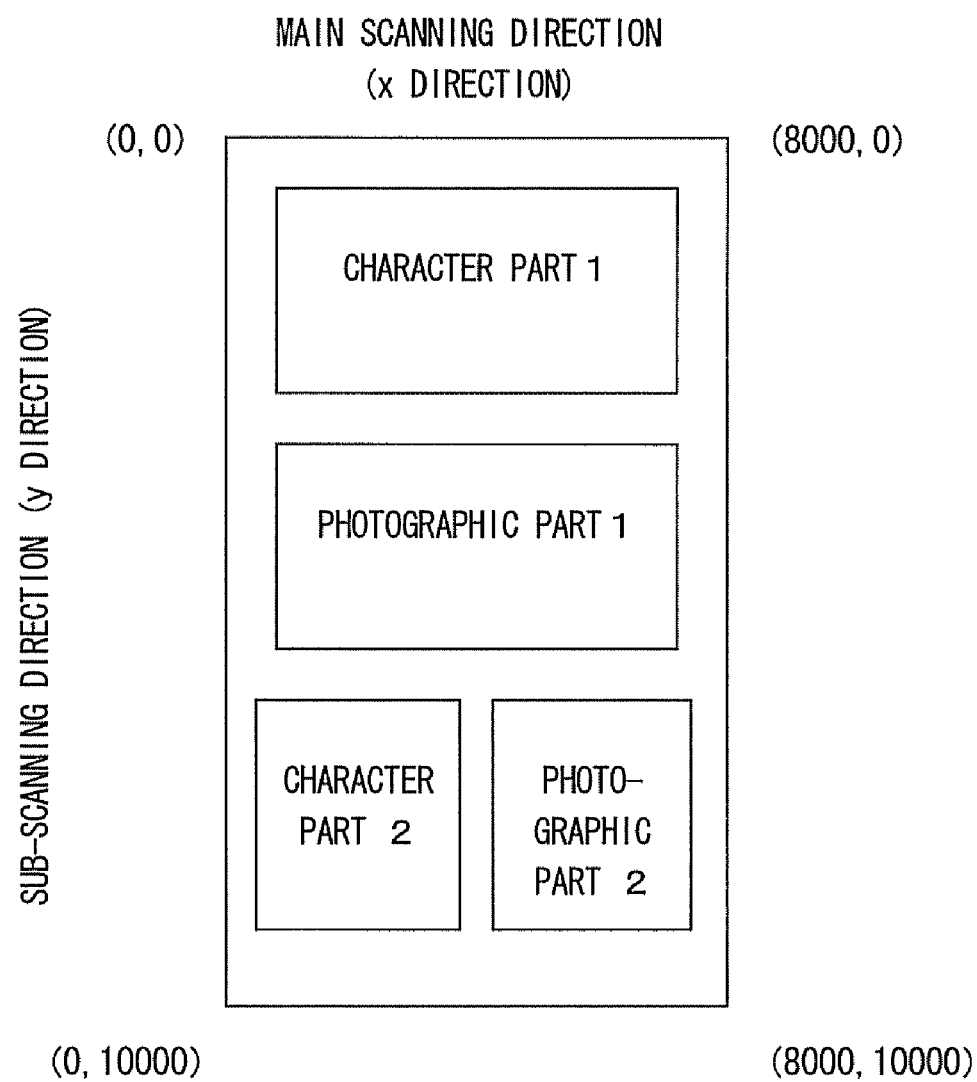
FIG. 12 is a view showing an example in which a character area and a photographic area are mixed on one image.

When a description is made using a character part 1 shown in FIG. 12 as an example, the main scanning direction is 200 to 6500, the sub-scanning direction is 300 to 2500, and the coordinates of four apexes indicating the area are (200, 300), (6500, 300), (200, 2500) and (6500, 2500). Incidentally, in order to clarify the area information, it can also be expressed by only diagonal coordinates, and in this case, it can be expressed by START address (200, 300) and END address (6500, 2500).

Since 200 and 300 are decimal numbers, when these are expressed in hexadecimal numbers, they become 00C8(H) and 012C(H). Similarly, 6500 and 2500 can be expressed by 09C4(H) and 1964(H) (see FIG. 13).

Besides, by adding information indicating character/photograph to the coordinate information, the image information and the coordinates can be expressed. As the image information, as shown in FIG. 14, when the most significant bit of 16-bit data is used, and when the most significant bit="0" expresses the character area, and the most significant bit="1" expresses the photographic area, the character part 1 has START address "00C8012C" and END address "09C41964".

Similarly, the photographic part 2 can be expressed by START address "8FA09770" and END address "99649F40". As stated above, one area can be stored in the page memory by using 4-Byte data.

Figure 15:
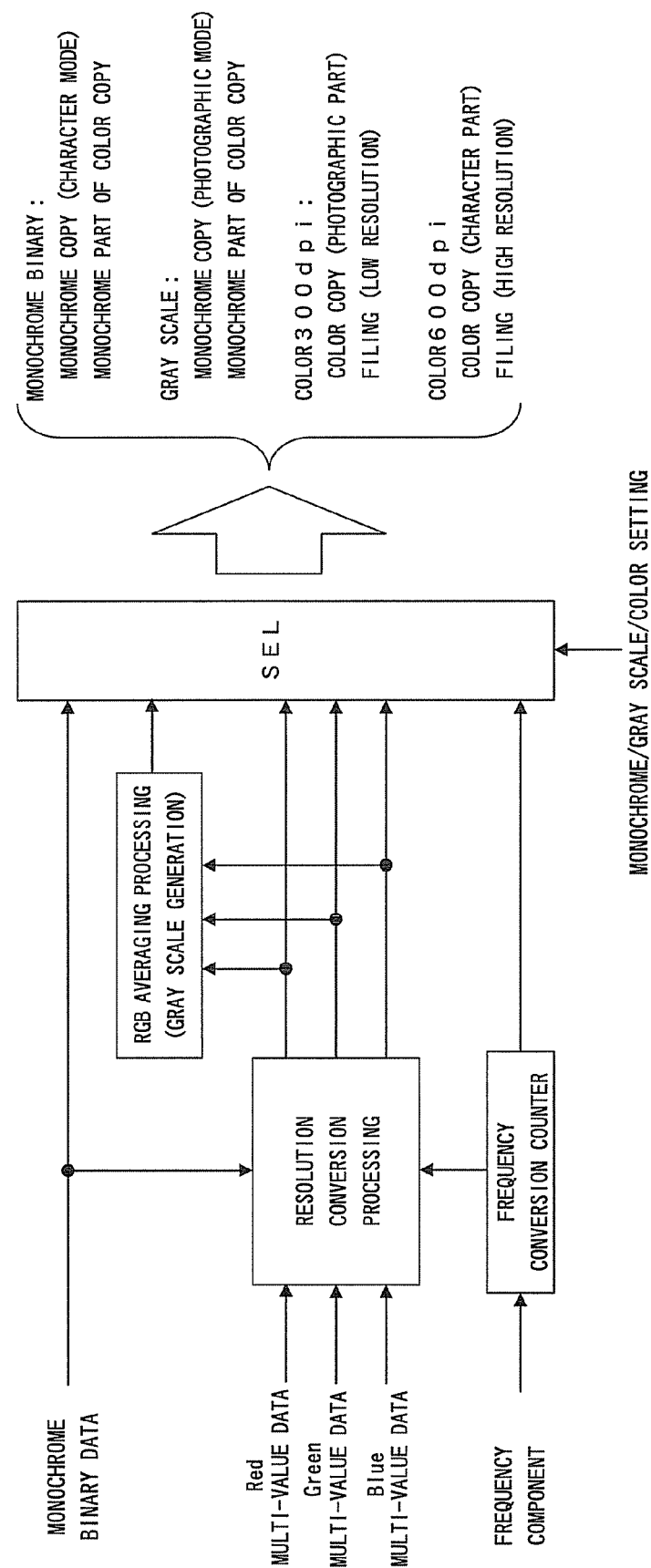
FIG. 15 is a view for explaining a flow of respective image data outputted from a page memory.
Figure 16:
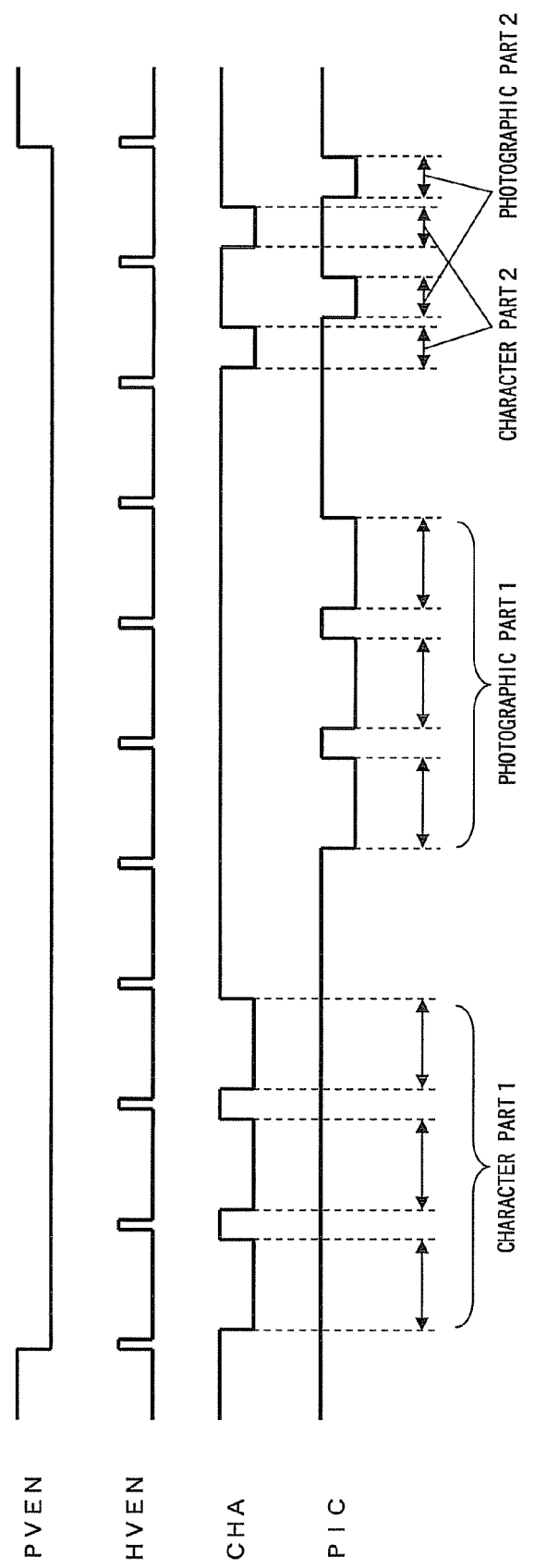
FIG. 16 is a view for explaining processing timings relating to a resolution conversion processing.

FIG. 15 is a view for explaining a flow of respective image data outputted from the page memory, and FIG. 16 and FIG. 17 are views for explaining processing timings relating to a resolution conversion processing.

Monochrome binary data stored in the page memory is inputted to a subsequent selector (SEL) circuit and a resolution conversion circuit. Red multi-value data, Green multi-value data and Blue multi-value data, which are 300 dpi color data, are respectively inputted to the resolution conversion processing, and the resolution conversion is performed from 300 dpi to 600 dpi based on the monochrome binary data.

At this time, in a coordinate conversion counter unit, a CHA signal indicating a character area shown in FIG. 16 and a PIC signal indicating a photographic area are generated from the spatial frequency data (discrimination information) stored in the page memory, and when the CHA signal is effective, the resolution conversion processing is performed. Here, a PVEN (=PageVideoENable) signal shown in FIG. 16 is a signal which becomes "L" when the image is effective in the sub-scanning direction, and a HVEN (HorizontalVideoENable) signal is a signal which becomes "L" in a portion where the image is effective in the main scanning direction.

That is, according to this embodiment, in one image data, images of different resolutions can be generated for respective image objects (character, line drawing, photograph, etc.), for example, an image of high resolution is generated for the character portion in order to clearly display it, and an image in the photographic portion is generated while the low resolution is not changed in order not to impair the color reproducibility. As stated above, the high resolution monochrome image data and the low resolution color image data are chosen according to circumstances, so that the data capacity in the storage area is suppressed, and the image data of quality to satisfy user's requests can be provided.

As stated above, although the output resolution of an image can be automatically controlled based on the monochrome 600-dpi signal, since the output content desired by the user is unclear, an output request mode by the control panel, specifically, monochrome/gray scale (monochrome multi-value)/color setting is inputted to the selector, so that the outputs of monochrome binary, gray scale, and color are switched and outputted.

Besides, in the case of color filing, the initial setting is made a resolution is 300 dpi, a compression processing is performed by the system control unit (see FIG. 6), and an output is made to the outside through the network, however, in the case where "high fineness" is selected by the user on the control panel (or via the network from the PC), it is preferable that the resolution conversion processing is performed on all areas of the image, the compression processing is performed by the system control unit as 600-dpi color signals, and an output is made to the outside via the network.

FIG. 18 is a flowchart for explaining a rough flow of processing (image reading method) in the image reading apparatus of the embodiment.

The first image reading unit 101 reads an image in monochrome from an original document at a first resolution (first image reading step) (S901).

The second image reading unit 102 reads an image in color from an original document at a second resolution lower than the first resolution (second image reading step) (S902).

In this embodiment, since the foregoing 4-line sensor is adopted, the processings of the first image reading step and the second image reading step can be executed in parallel.

The binarization processing unit 103 binarizes the image data read at the first image reading step (binarization processing step) (S903).

The discrimination information generation unit 104 generates discrimination information to discriminate whether an image constituted by respective pixels in respective image data belongs to a first image type in which priority is to be given to luminance resolution or a second image type in which priority is to be given to color reproducibility (discrimination information generation step) (S904). Specifically, the discrimination information generation step generates, as the discrimination information, the color spatial frequencies of the respective pixels in the respective image data.

The position information acquisition unit 105 acquires position information indicating, in the respective image data read from the same original document at the first and the second image reading steps, corresponding positions of the respective pixels on the original document (position information acquisition step) (S905).

The color information acquisition unit 106 acquires color information indicating colors of the respective pixels in the respective image data (color information acquisition step) (S906). Specifically, the color information acquisition unit 106 acquires the color information of the respective pixels in the image data read by the first image reading unit 101 based on the image data binarized at the binarization processing step.

The storage unit 107 associates the position information acquired at the position information acquisition step with the color information acquired at the color information acquisition step with respect to the pixel corresponding to the position information, and stores them into the specified storage area (storage step) (S907). At the storage step, the position information acquired at the position information acquisition step is further associated with the discrimination information generated at the discrimination information generation step with respect to the pixel corresponding to the position information, and they can be stored in the specified storage area.

Besides, at the storage step, the position information and the color information are grouped based on the discrimination information, and they can be stored in the specified storage area.

Incidentally, at the storage step, it is desirable that the position information and the color information of the image read at the first and the second image reading steps are simultaneously stored in the specified storage area.

The respective steps of the processing in the image reading apparatus M are realized by causing the CPU 801 to execute an image reading program stored in the MEMORY 802.

Although the description has been given to the case where the function to carry out the invention is previously recorded in the inside of the apparatus, no limitation is made to this, and the same function may be downloaded from a network to the apparatus, or the same function stored on a recording medium may be installed in the apparatus. The recording medium may have any mode as long as the recording medium, such as a CD-ROM, can store a program and can be read by the apparatus. Besides, the function obtained by the previous installation or download may realize the function in cooperation with the OS (Operating System) in the inside of the apparatus.

As stated above, according to the embodiment, the outputs of the image sensor for high resolution monochrome reading and the image sensor for low resolution color reading are simultaneously stored in the page memory, so that high speed transfer of color data becomes possible. Besides, the color resolution conversion is performed by the subsequent processing, so that the image output to which the image processing desired by the user is applied can be realized in a short time.

Besides, as in the embodiment, the discrimination information is associated with the information of position and color of the pixel and they are stored in the storage area, so that it becomes easy to discriminate the character area from the photographic area at the time when a desired processing is performed on the image data, and it becomes possible to easily perform the conversion into the desired resolution based on the discrimination information of the image data.

Although the invention has been described in detail by using the specific embodiment, it would be apparent for one of ordinary skill in the art that various modifications and improvements can be made without departing from the sprit and scope of the invention.

As described above in detail, according to the invention, it is possible to provide the technique which can contribute to the reduction of data capacity of image data read from the original document in the image reading apparatus and can contribute to the realization of flexible image processing to meet user's requests.

What is claimed is:

1. An image reading apparatus comprising:
a first image reading unit configured to read an image in monochrome from an original document at a first resolution;
a second image reading unit configured to read an image in color from an original document at a second resolution lower than the first resolution;
a position information acquisition unit configured to acquire position information indicating, in respective image data read by the first and the second image reading units from the same original document, corresponding positions of respective pixels on the original document;
a color information acquisition unit configured to acquire color information indicating colors of the respective pixels in the respective image data; and
a storage unit configured to associate the position information acquired by the position information acquisition unit with the color information acquired by the color information acquisition unit with respect to the pixel corresponding to the position information and to store them in a specified storage area.

2. The image reading apparatus according to claim 1, further comprising
a discrimination information generation unit configured to generate discrimination information for discriminating whether an image constituted by the respective pixels in the respective image data belongs to a first image type in which priority is to be given to luminance resolution or a second image type in which priority is to be given to color reproducibility,
wherein the storage unit further associates the position information acquired by the position information acquisition unit with the discrimination information generated by the discrimination information generation unit with respect to the pixel corresponding to the position information and stores them in the specified storage area.

3. The image reading apparatus according to claim 1, wherein the discrimination information generation unit generates, as the discrimination information, color spatial frequencies of the respective pixels in the respective image data.

4. The image reading apparatus according to claim 3, wherein the storage unit groups the position information and the color information based on the discrimination information and stores them in the specified storage area.

5. The image reading apparatus according to claim 1, wherein the storage unit simultaneously stores the position information and the color information with respect to the image read by the first and the second image reading units into the specified storage area.

6. The image reading apparatus according to claim 1, further comprising
a binarization processing unit configured to binarize the image data read by the first image reading unit,
wherein the color information acquisition unit acquires the color information of the respective pixels in the image data read by the first image reading unit based on the image data binarized by the binarization processing unit.

7. The image reading apparatus according to claim 1, wherein the second image reading unit is a 3-line CCD sensor including a line sensor for red color, a line sensor for green color and a line sensor for blue color.

8. An image reading apparatus comprising:
first image reading means for reading an image in monochrome from an original document at a first resolution;
second image reading means for reading an image in color from an original document at a second resolution lower than the first resolution;
position information acquisition means for acquiring position information indicating, in respective image data read by the first and the second image reading means from the same original document, corresponding positions of respective pixels on the original document;
color information acquisition means for acquiring color information indicating colors of the respective pixels in the respective image data; and
storage means for associating the position information acquired by the position information acquisition means with the color information acquired by the color information acquisition means with respect to the pixel corresponding to the position information and for storing them in a specified storage area.

9. The image reading apparatus according to claim 8, further comprising
discrimination information generation means for generating discrimination information for discriminating whether an image constituted by the respective pixels in the respective image data belongs to a first image type in which priority is to be given to luminance resolution or a second image type in which priority is to be given to color reproducibility,
wherein the storage means further associates the position information acquired by the position information acquisition means with the discrimination information generated by the discrimination information generation means with respect to the pixel corresponding to the position information and stores them in the specified storage area.

10. The image reading apparatus according to claim 8, wherein the discrimination information generation means generates, as the discrimination information, color spatial frequencies of the respective pixels in the respective image data.

11. The image reading apparatus according to claim 10, wherein the storage means groups the position information and the color information based on the discrimination information and stores them in the specified storage area.

12. The image reading apparatus according to claim 8, wherein the storage means simultaneously stores the position information and the color information with respect to the image read by the first and the second image reading means into the specified storage area.

13. The image reading apparatus according to claim 8, further comprising
   binarization processing means for binarizing the image data read by the first image reading means,
   wherein the color information acquisition means acquires the color information of the respective pixels in the image data read by the first image reading means based on the image data binarized by the binarization processing means.

14. The image reading apparatus according to claim 8, wherein the second image reading means is a 3-line CCD sensor including a line sensor for red color, a line sensor for green color and a line sensor for blue color.

15. An image reading method comprising:
   a first image reading step of reading an image in monochrome from an original document at a first resolution;
   a second image reading step of reading an image in color from an original document at a second resolution lower than the first resolution;
   a position information acquisition step of acquiring position information indicating, in respective image data read at the first and the second image reading steps from the same original document, corresponding positions of respective pixels on the original document;
   a color information acquisition step of acquiring color information indicating colors of the respective pixels in the respective image data; and
   a storage step of associating the position information acquired at the position information acquisition step with the color information acquired at the color information acquisition step with respect to the pixel corresponding to the position information and storing them in a specified storage area.

16. The image reading method according to claim 15, further comprising
   a discrimination information generation step of generating discrimination information for discriminating whether an image constituted by the respective pixels in the respective image data belongs to a first image type in which priority is to be given to luminance resolution or a second image type in which priority is to be given to color reproducibility,
   wherein at the storage step, the position information acquired at the position information acquisition step is further associated with the discrimination information generated at the discrimination information generation step with respect to the pixel corresponding to the position information and they are stored in the specified storage area.

17. The image reading method according to claim 15, wherein at the discrimination information generation step, color spatial frequencies of the respective pixels in the respective image data are generated as the discrimination information.

18. The image reading method according to claim 17, wherein at the storage step, the position information and the color information are grouped based on the discrimination information and are stored in the specified storage area.

19. The image reading method according to claim 15, wherein at the storage step, the position information and the color information with respect to the image read at the first and the second image reading steps are simultaneously stored in the specified storage area.

20. The image reading method according to claim 15, further comprising
   a binarization processing step of binarizing the image data read at the first image reading step,
   wherein at the color information acquisition step, the color information of the respective pixels in the image data read at the first image reading step is acquired based on the image data binarized at the binarization processing step.

* * * * *